United States Patent [19]

Fava

[11] Patent Number: 5,501,138
[45] Date of Patent: Mar. 26, 1996

[54] AUTOMATIC ASSEMBLY FOR DELIVERING COFFEE INFUSIONS, WITH MEANS FOR EJECTING THE COFFEE DRY GROUNDS

[76] Inventor: Ermenegildo Fava, Via Po, 7, 20059 Vimercate (Milano), Italy

[21] Appl. No.: 243,751

[22] Filed: May 17, 1994

[30] Foreign Application Priority Data

Jun. 15, 1993 [IT] Italy .................. MI93A1279

[51] Int. Cl.[6] .............. A47J 31/34; A47J 31/36
[52] U.S. Cl. ............ 99/287; 99/289 R; 99/302 P
[58] Field of Search .................. 99/289 R, 187, 99/289 D, 289 P, 297, 300, 301 R, 302 P; 426/433

[56] References Cited

U.S. PATENT DOCUMENTS 2,943,556 7/1960 Egi ........................... 99/289 R
3,593,649 7/1971 Nove ......................... 99/289 R

*Primary Examiner*—Robert W. Jenkins
*Attorney, Agent, or Firm*—Bucknam and Archer

[57] ABSTRACT

The invention relates to an automatic assembly for delivering infusions of coffee and the like, with means for ejecting the dry coffee grounds, characterized in that said assembly comprises a stator body, in the inside of which there is rotatably supported a rotor, including a chamber housing an infusion piston therein.

The rotor can be successively located at a loading station for introducing the coffee powder, an infusion station and at an unloading station.

Pressing means there are moreover provided operating on the piston for pressing the coffee powder before making the infusion, and for drying-pressing the coffee pad after having made the infusion.

6 Claims, 5 Drawing Sheets

AUTOMATIC ASSEMBLY FOR DELIVERING COFFEE INFUSIONS, WITH MEANS FOR EJECTING THE COFFEE DRY GROUNDS

BACKGROUND OF THE INVENTION

The present invention relates to an automatic assembly for delivering infusions of coffee and the like, with an automatic ejecting of the dry coffee grounds.

There are already available automatic assemblies for delivering infusions of coffee which substantially comprise a body which can be displaced, successively, between a loading station in which the coffee powder is automatically introduced, and an infusion station, in which there is prepared the coffee infusions by suitably metering hot water.

These prior assemblies are also adapted to perform a further operating step, in which the coffee pad is brought to an unloading station for the ejection therefrom.

The mentioned prior coffee making assemblies, in addition to being very complex from a mere construction standpoint, have the further drawback of ejecting the pressed coffee pad in a wet condition.

SUMMARY OF THE INVENTION

Accordingly, the main object of the present invention is to solve the above mentioned problem, by providing an automatic assembly for delivering infusions of coffee and the like, with means for ejecting dry coffee grounds, which allows to perform, after the delivery of the coffee infusion, a drying step on the pressed coffee pad.

More specifically, the above mentioned automatic assembly which is specifically adapted to perform a programmed set of operating steps, by exploiting a hydraulic pressure for all of the driving movements of the infusing piston, is very reliable and safe in operation and, moreover, is very competitive from a mere economic standpoint.

According to one aspect of the present invention, the above mentioned aim and objects, as well as yet other objects, which will become more apparent hereinafter, are achieved by an automatic assembly for delivering infusions of coffee and the like, with means for ejecting the dry coffee grounds, characterized in that said assembly comprises a stator body in the inside of which there is rotatably supported a rotor, including a chamber housing therein an infusion piston, said rotor being adapted to be arranged, successively, at a loading station for introducing coffee powder, an infusion station and an unloading station, pressing means being moreover provided, operating on said piston, for pressing the coffee powder, before making the infusion, and for dry-pressing the coffee powder pad upon having made the infusion.

BRIEF DESCRIPTION OF THE DRAWINGS

Further characteristics and advantages of the invention will become more apparent hereinafter from the following detailed description of a preferred, though not exclusive, embodiment of an automatic assembly for delivering infusions of coffee and the like, with the ejection of dry coffee grounds, and being illustrated, by way of an indicative, but not limitative example, in the accompanying drawings, where.

DESCRIPTION OF THE PREFERRED EMBODIMENT

With reference to the number references of the figures of the accompanying drawings, the automatic assembly for delivering infusions of coffee and the like, with an ejection of dry coffee grounds, according to the present invention, comprises a stator body, generally indicated at the reference number 1, which rotatably supports, in its inside, a rotor 2 which can have a cylindric or spheric configuration.

Figure 5:
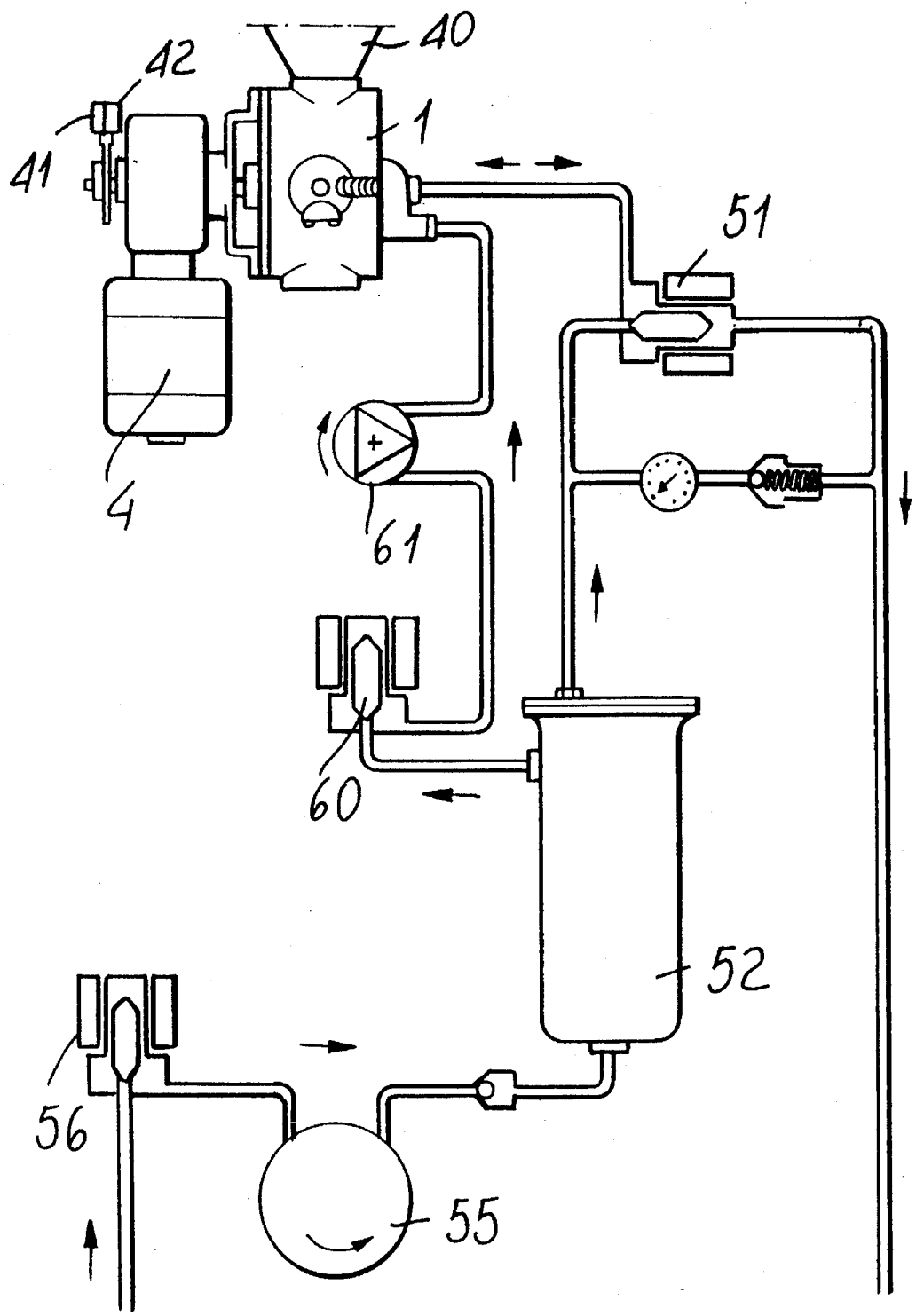
FIG. 5 illustrates a hydraulic diagram of the subject assembly.
Figure 6:
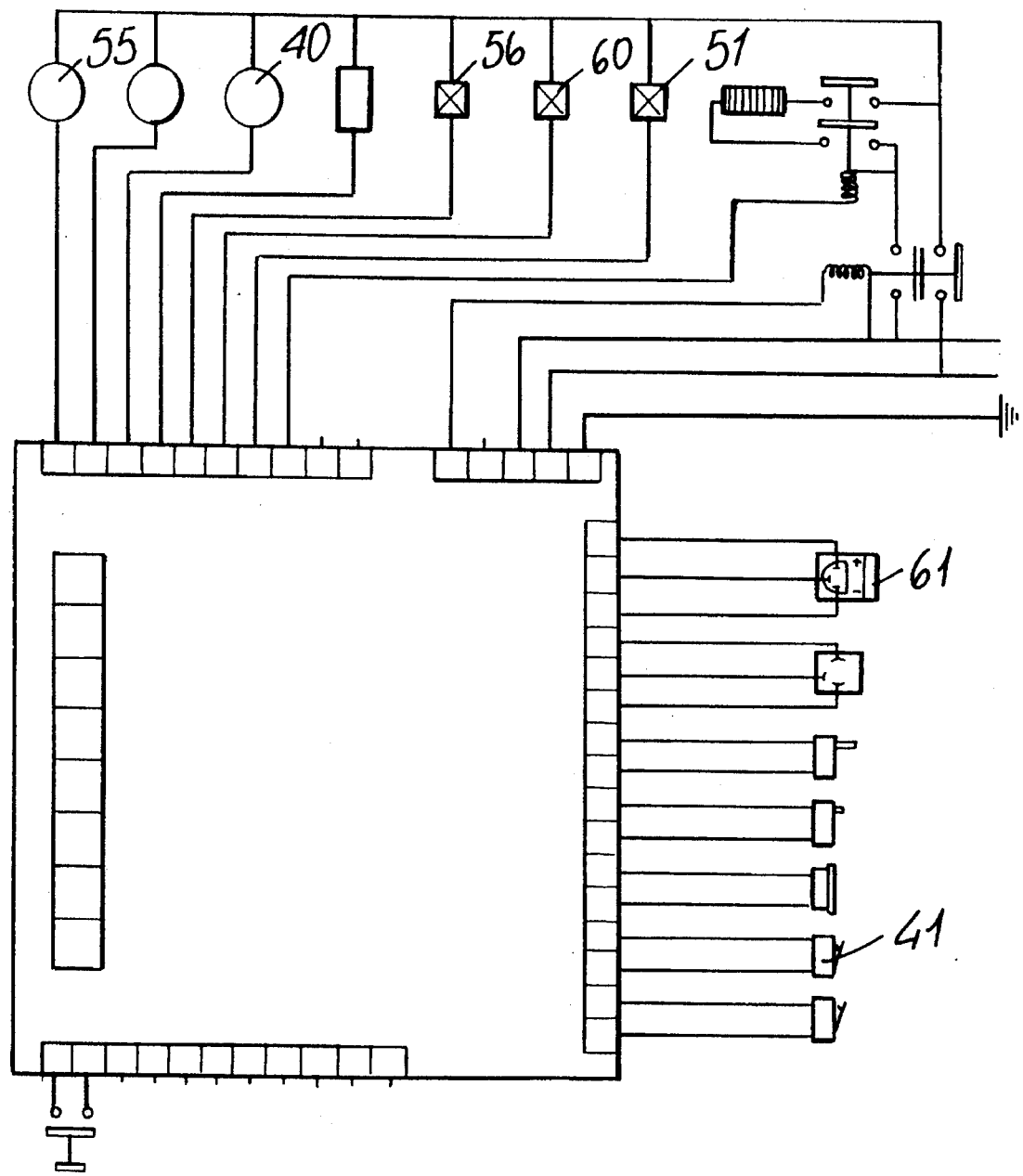
FIG. 6 illustrates an electric diagram of the subject assembly.

More specifically, the rotor 2 is provided with rotary pins 3 which are connected to a reducing-motor unit, generally indicated at the reference number 4 (FIG. 5).

Inside the rotor 2 there is provided a chamber 5, in which a piston can move, said piston being indicated generally by the reference number 10 and comprising a telescopic outer element 11 including sealing gasket 12, for providing sealing with respect to the bottom of the chamber 5, which communicates with a duct for introducing water for driving the piston, said duct being indicated at the reference number 13 and axially projecting with respect to the rotary pins 3.

The inner telescopic element 12 is provided, at the bottom thereof, with an abutment 16 therewith an outer spring 17 engages, said spring affecting, at the other portions thereof, a flange portion 18 of an inner telescopic element 19 provided with a flange inner position 20 thereon an inner spring 21 operates which engages, at the other end thereof, with a rim portion 22 of a fixed lug 23 connected to the bottom of the chamber.

At the top portion of the outer telescopic element there are provided channels 30 for introducing the infusion water, which communicate with ducts 31 for delivering the infusion water.

Figure 1:
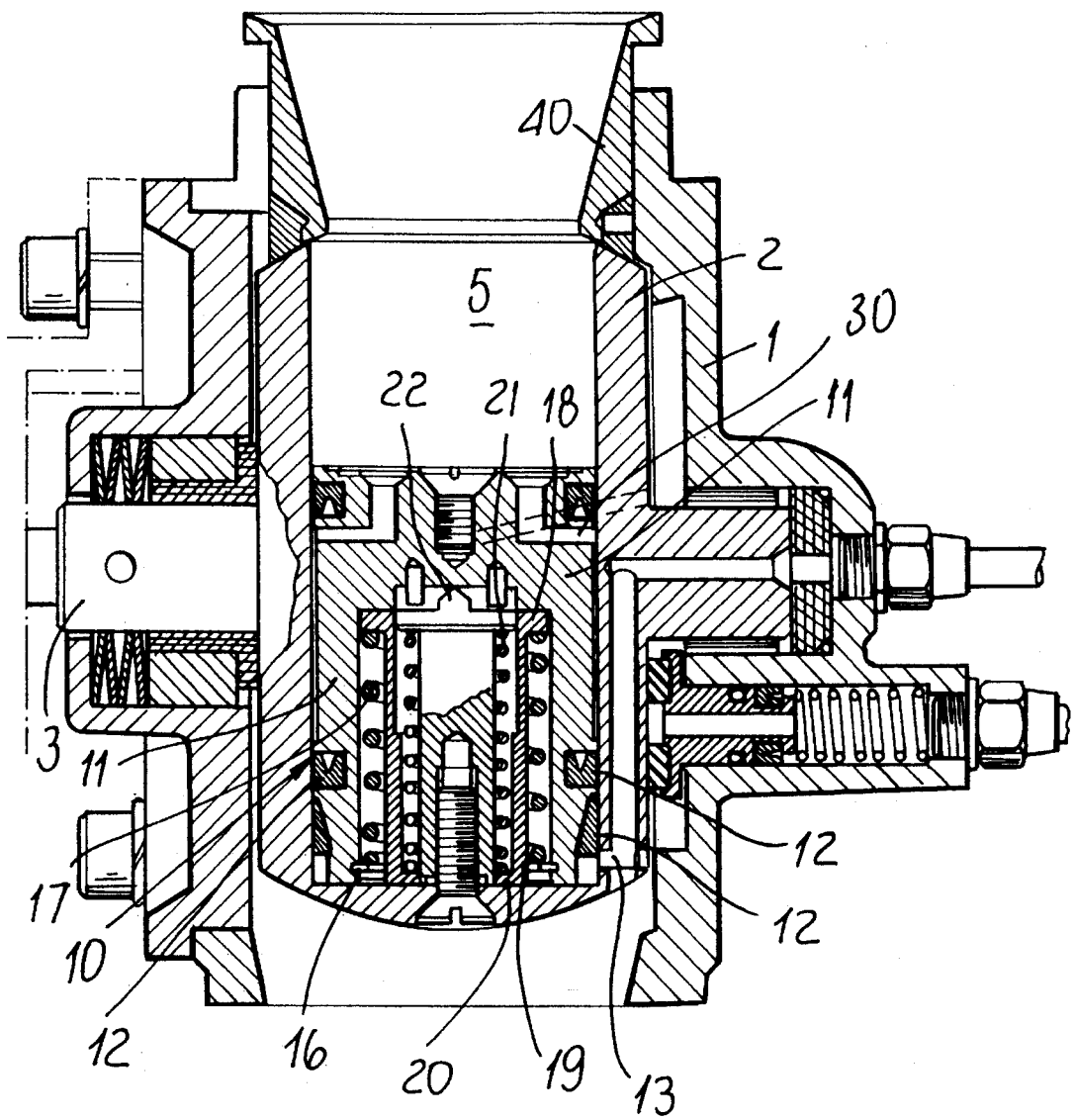
FIG. 1 is a cross-sectional view illustrating the automatic assembly according to the invention, and substantially taken along an axial plane.
Figure 4:
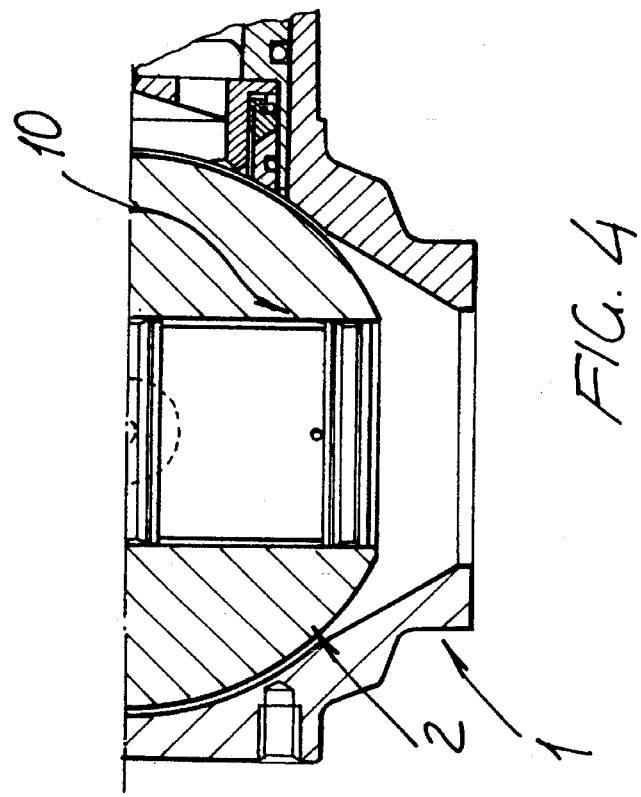
FIG. 4 illustrates the subject assembly in its unloading position.
Figure 2:
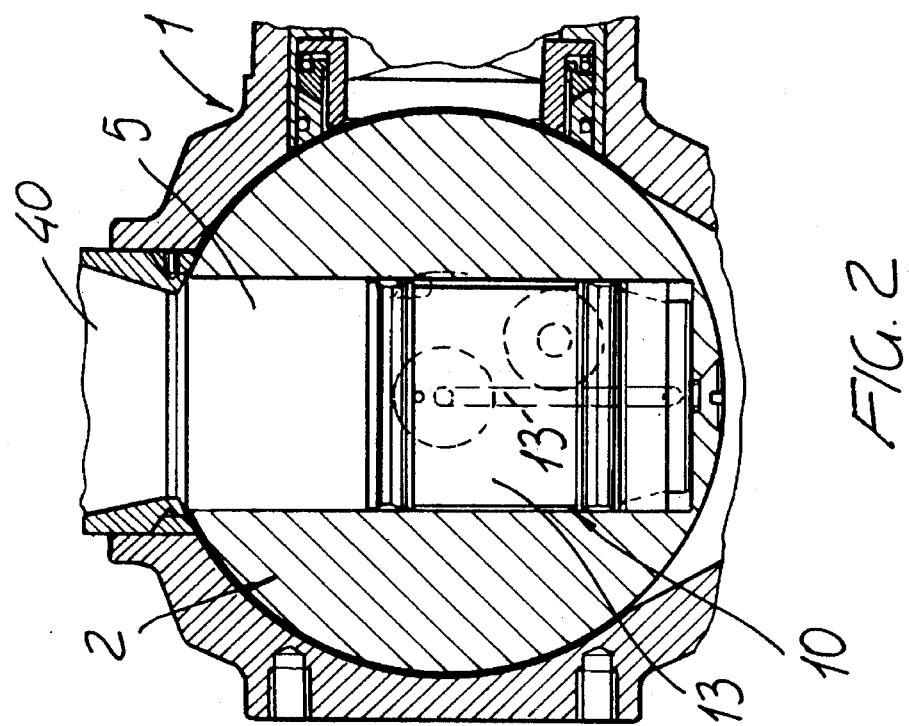
FIG. 2 illustrates the assembly according to the invention in its loading position and as cross-sectioned perpendicularly to the rotation axis.

As shown in FIGS. 1 and 2, the rotor 2 can be arranged at a loading position, in which the open portion of the chamber 5 is arranged under a hopper 40 for introducing the coffee powder.

Figure 3:
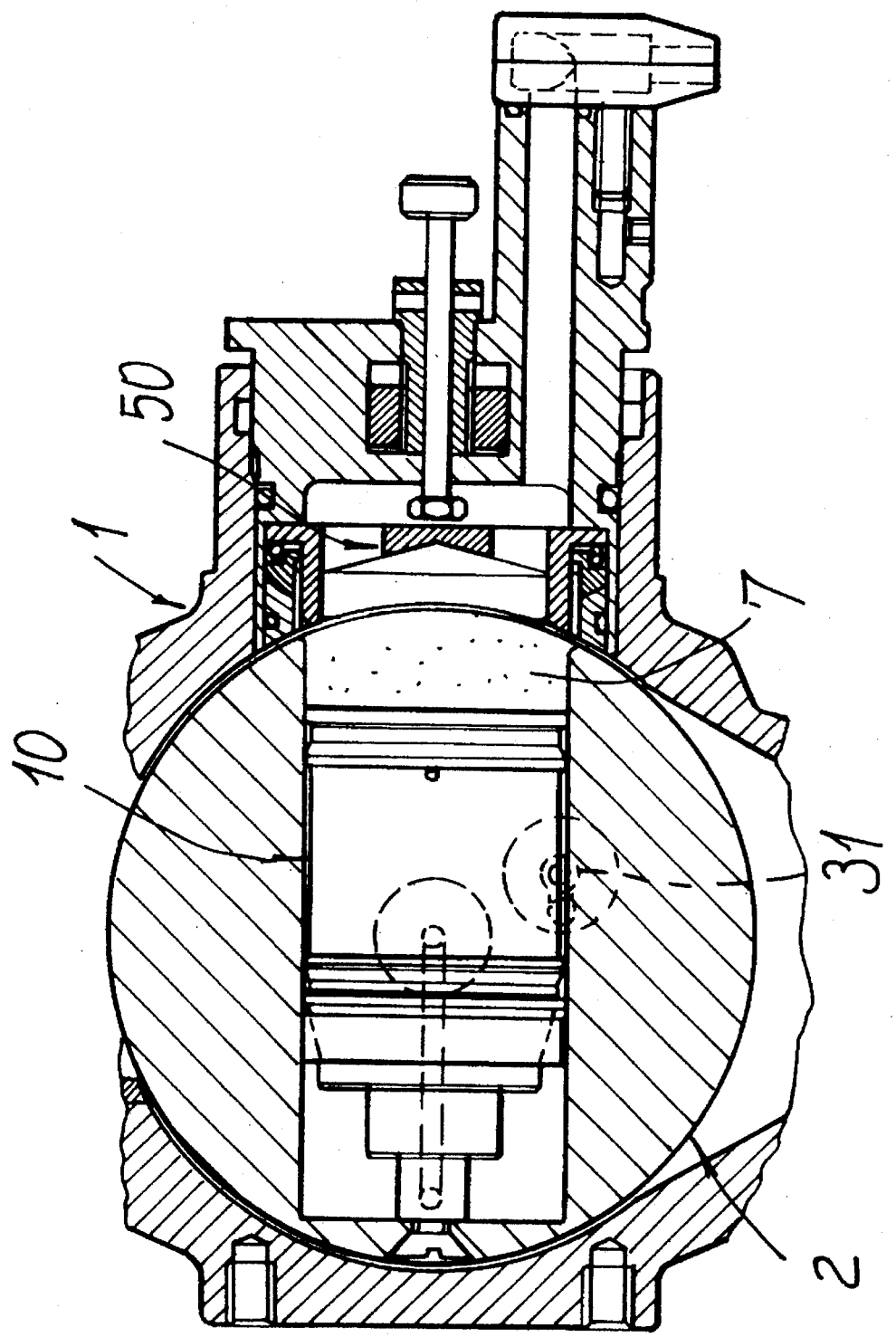
FIG. 3 illustrates the subject assembly in its infusion position.

After having introduced the desired amount of coffee powder, the rotor is turned through 90° (FIG. 3) by means of the reducing motor unit and the microswitches 41 and 42 controlling said motor unit, so as to locate the chamber 5 near an infusion assembly, indicated at the reference number 50.

In this condition, there is operated a delivery solenoid valve 51, for delivering driving water, which will introduce from the boiler 52 water inside the chamber 5, on the bottom of the piston, thereby driving said piston so as to properly press the coffee powder.

During this operating step will operate the pump 55 which will introduce water into the tank 52 and being controlled by the main solenoid valve 56.

As water is introduced to the bottom of the piston through the delivery solenoid valve 51, the coffee powder pad will be pressed.

Then, hot water, having a controlled temperature, will be introduced from the shower of the piston through the duct 30 and through the solenoid delivery valve 60 controlling a turbine 61 which controls the amount and stop.

After having delivered the coffee infusion, the pad will be further pressed, by the rear pressure of the telescopic piston 3, for a time depending on the volume of the pad 7.

Then, the solenoid delivery valve 51 will be stopped and the rotor 2 will be turned so as to bring the coffee pad to the unloading station, where the pressed and dry coffee powder pad will be ejected.

The ejection is performed by delivering water through the solenoid valve so as to cause the pressed coffee pad to be ejected.

Then, the rotor 2 will be turned again so as to bring the piston to its starting position, and the solenoid valve 51 will be stopped so as to bring again the piston to its load condition under the effect of the springs 17 and 21.

From the above disclosure it should be apparent that the invention fully achieves the intended aim and objects.

In particular the fact is to be pointed that an automatic assembly has been provided which allows to perfectly press the coffee powder pad, to provide a perfectly dried coffee pad, thereby solving all of the above mentioned problems.

The invention, as disclosed, is susceptible to several variations and modifications, all of which will come within the scope of the inventive idea.

Moreover, all of the details can be replaced by other technically equivalent elements.

In practicing the invention, the used materials, as well the contingent size and shapes, can be any, depending on requirements.

I claim:

1. An automatic assembly for delivering infusions of coffee and ejecting dry coffee grounds, comprising a stator body, a rotor rotatably supported inside said stator body, said rotor defining a chamber housing therein a movable infusion piston comprising an outer telescopic element including a sealing gasket sealing a bottom portion of said chamber, which communicates with a duct for introducing water for pressing on and driving said piston, driving means being moreover provided for rotatively driving said rotor to bring successively said rotor to a coffee powder loading station, an infusion station and an unloading station, and driving means including rotary pins associated with said rotor and a reducing motor unit, said outer telescopic element having a bottom including an abutment engaging with an end of an outer spring another end of which abuts against a flange portion of an inner telescopic element provided with a flange inner portion thereon an inner spring operates which engages with a rim portion of a fixed lug connected to said bottom portion of said chamber.

2. An automatic assembly, according to claim 1, wherein said outer telescopic element comprises, at a top portion thereof, channels for delivering infusion water, said channels being adapted to be communicated with ducts to deliver infusion water.

3. An automatic assembly, according to claim 2, wherein said assembly further comprises a further solenoid valve for controlling said ducts for delivering a set amount of said infusion water.

4. An automatic assembly according to claim 1, wherein said bottom portion of said chamber, communicates with a duct for introducing water for driving said movable infusion piston.

5. An automatic assembly, according to claim 1, further comprising at said motor reducing unit, microswitches adapted to control the movement of said rotor to said stations.

6. An automatic assembly, according to claim 1, said assembly further comprises a solenoid valve controlling said duct for introducing said water for driving said piston said water being taken from a boiler and introduced into said chamber at a bottom portion of said piston.

\* \* \* \* \*